UNITED STATES PATENT OFFICE 2,629,702

COMPOSITION FOR TEXTILE FINISHING

Harry L. Snyder, Jr., Detroit, Mich.

No Drawing. Application May 6, 1949,
Serial No. 91,870

4 Claims. (Cl. 260—29.7)

This invention concerns plastic compositions for use in textile finishing and refers particularly to an emulsion of polyvinyl acetate stabilized against the coagulating influences of agitation and foaming, particularly upon the addition of water.

Emulsions of polyvinyl acetate have been used successfully as so called permanent starches in the finishing of textiles and attempts have been made to bottle relatively concentrated emulsions of this material for home use. Practical considerations make it necessary that the material be prepared for home use in a relatively concentrated form and that the material be diluted with water prior to use in order to secure a composition with a suitable proportion of polyvinyl acetate.

It has been found that agitation or shaking of polyvinyl acetate emulsions, particularly following the addition of water, causes foaming, with the foam passing into a polymer agglomerate rather than returning to a stable emulsion. The normal movement encountered in transporting the emulsion from one place to another is sufficient to induce the solid agglomerate formation and a resulting settling out of the agglomerates. The addition of water, even with slight agitation, causes the formation of agglomerates which settle out leaving a clear supernatant liquid wholly unsuitable for textile finishing. It has been found that the extent of the settling out is more or less proportional to the quantity of water added.

In addition to the agglomerate formation and particularly during the period of time the polymer is coagulating the liquid tends to separate into a cloudy layer, which includes the emulsified polymer, and a clear supernatant liquid. Although the settled cloudy layer may be redispersed, the extent and rate of settling is more or less an indication of the degree of instability and such emulsions are soon rendered ineffective on prolonged agitation, foaming, or on further dilution with water.

Polyvinyl acetate sizing has the additional disadvantage of imparting a stiffness to textile materials which, for many applications of the latter, is undesirable.

It is an object of this invention to provide a stable emulsion of polyvinyl acetate.

It is a further object to provide an emulsion of polyvinyl acetate which can be bottled in a relatively concentrated form for subsequent dilution with water while retaining stability of the emulsion.

It is an object to provide an emulsified composition comprising polyvinyl acetate which is stable against the coagulating influences of agitation, foaming, and the addition of water.

It is a still further object of the invention to provide a sizing for textiles which comprises polyvinyl acetate but which is more enduring, more wash resistant, and more pliant than a sizing produced by polyvinyl acetate alone.

I have now found that the foregoing and related objects can be secured with a composition comprising an emulsion of polyvinyl acetate and an emulsion of a styrene-butadiene copolymer. Compositions of a preferred embodiment of the invention include at least about one half part of the copolymer for each part of polyvinyl acetate.

Additions of relatively minor proportions of an emulsified styrene-butadiene copolymer to an emulsified polyvinyl acetate tend to substantially eliminate polymer agglomerate formation as a result of foaming and other coagulating influences, and reduce the tendency of the emulsion to separate into a cloudy layer and a clear supernatant layer. Upon further additions of the emulsified copolymer a point of stability is reached; that is, no polymer agglomerates form and there is little or no settling of the polyvinyl acetate.

The exact proportion of emulsified copolymer required for stability of the polyvinyl acetate depends to some extent on the presence of other ingredients in the composition. For example, starch is sometimes used in textile finishing compositions and its presence increases the stability of polyvinyl acetate emulsion to some extent. In this case, for example, the minimum proportions of styrene-butadiene copolymer necessary for stabilization of the polyvinyl acetate emulsion may be somewhat less than the minimum required in the absence of starch but in any case such minimum proportion of copolymer is very near one half part per part of polyvinyl acetate. The proportions refer to the actual weights of the polymeric materials present and does not refer to the volume of emulsion used.

In the preparation of the compositions of this invention it is preferred that the emulsion of polyvinyl acetate and the emulsion of the copolymer be prepared separately using standard chemical techniques. However, emulsions of polyvinyl acetate and emulsions of the styrene-butadiene copolymer are commercially available and it is equally satisfactory to mix the emulsions of commerce in the proportions given. Although the proportions of styrene relative to butadiene in the particular copolymer may vary over a wide range, this does not significantly alter the minimum proportion required for stabilization of the polyvinyl acetate.

The following examples and the chart illustrate the effects of adding certain specific proportions of emulsified styrene-butadiene copolymer to emulsified polyvinyl acetate. In the chart PVA refers to a polyvinyl acetate emulsion containing about 55% solids and S-B refers to a styrene-butadiene copolymer emulsion containing about 45% solids.

*Example 1*

125 c. c. of water and 25 c. c. of a polyvinyl acetate emulsion containing about 55% solids were added to each of seven test tubes. The particular polyvinyl acetate used in this example is sold under the trade identification Darex 56-L. To each of the emulsions in successive test tubes starting with the second; 5, 10, 15, 20, 30 and 50 c. c. respectively of a styrene-butadiene copolymer were added. The particular styrene-butadiene copolymer used in this example is sold under the trade identification Dow 512K and, as added, consisted of 45% copolymer. Each of the tubes was permitted to stand for a three week period. The results are summarized in rows E and F of the chart. In the first tube which contained no stabilizer, heavy agglomerates formed which floated on top of the clear liquid and practically no cloudiness remained to indicate the presence of emulsified particles in the tube. In the second tube containing about 0.16 part of stabilizer to each part of polyvinyl acetate there was a small proportion of agglomeration, the principal effect being the formation of a cloudy layer which settled to occupy the lower 40% of the liquid volume. In the third tube containing about 0.33 part of the stabilizer for each part of polyvinyl acetate there was a very slight agglomeration and the formation of a cloudy layer which occupied the lower 60% of the liquid. In the fourth tube which contained about 0.49 part of stabilizer per part of polyvinyl acetate there was a trace of agglomeration and the formation of a cloudy layer which occupied about 80% of the liquid volume. In the fifth, sixth and seventh tubes, which contained respectively, about 0.65, 1.0 and 1.6 parts of the stabilizer per part of polyvinyl acetate, there was no agglomeration and no settling of the cloudy layer, the emulsion being stable at the conclusion of the test.

The above example is typical of the results obtained with stable emulsions from a variety of sources and under a variety of conditions. In each case where the polyvinyl acetate emulsion was subjected to various coagulating conditions, particularly agitation or increased water, the stability of the emulsion was improved by the presence of a quantity of the copolymer and in each case the sample containing about one-half part of the copolymer per part of polyvinyl acetate appeared to indicate the boundary condition between complete stability and slight settling.

*Example 2*

After observations were made on tubes similar to those of the previous example various quantities of water were added to tubes containing about 0.16 part of emulsified styrene-butadiene copolymer and similarly various quantities of water were added to tubes with each of the proportions of copolymer set out in Example 1. The results obtained by adding 180 c. c. of water to each of the tubes of Example 1 are typical and are summarized in row G of the chart.

In this latter case the 180 c. c. of water were added to each tube after the three week period. The tubes were then shaken and the additional effects of the test observed. Each proportion of the copolymer had a stabilizing effect and proportions in excess of about 0.5 part per part of polyvinyl acetate effected complete stabilization.

*Example 3*

The experiment of Example 1 was repeated except that 12.5 grams of a 10% starch solution were added to each of the test tubes. The results are summarized in row H of the chart. The most pronounced effect of added starch is to increase the stability of the emulsion but, as can be seen from the chart, the effect is one of degree only and there is no significant change in the lower limit of emulsified copolymer required for substantially complete stability. For example, in the second tube the settled layer constituted about 55% of the liquid volume as compared to 40% in the absence of the starch. In the fourth tube the settled layer constituted about 95% of the liquid volume as compared to about 80% in the absence of the starch.

*Example 4*

Various proportions of water were added to the tubes following Example 3. The results with 180 c. c. of added water are typical and are summarized in row J of the chart.

In other experiments using different combinations of emulsions and differing agglomerating influences the third tube showed a cloudy layer of as high as 80% with no separation in the fourth tube. A wide variety of tests therefore show that the minimum proportion of copolymer required for complete stability lies in the range of 0.4 to 0.6 part copolymer per part of the polyvinyl acetate or generally about 0.5.

| Test Tube No. | | 1 | 2 | 3 | 4 | 5 | 6 | 7 |
|---|---|---|---|---|---|---|---|---|
| A | c. c. of PVA | 25 | 25 | 25 | 25 | 25 | 25 | 25. |
| B | c. c. of water | 125 | 125 | 125 | 125 | 125 | 125 | 125. |
| C | c. c. of S-B | 0 | 5 | 10 | 15 | 20 | 30 | 50. |
| D | Parts of S-B per part PVA | 0 | 0.16 | 0.33 | 0.49 | 0.65 | 1.0 | 1.6. |
| E | Agglomeration | heavy | small | very slight | trace | none | none | none |
| F | Cloudy Layer, Percent of Liquid Vol | | 40 | 60 | 80 | 100 | 100 | 100. |
| G | Add 180 c. c. of water to F-agglomeration | | slight | slight | slight | none | none | none. |
| H | Cloudy Layer with Starch | | 55 | 65 | 94 | 100 | 100 | 100. |
| J | Add 180 c. c. of water to H-agglomeration | | slight | slight | none | none | none | none. |

The composition of the present invention may be readily bottled and marketed for home use to replace common starch now used as a sizing or stiffening agent. The composition may be applied to textiles of all types including animal fibers, nylon, cellulosic materials, etc., and may also be applied to paper. The composition has several valuable advantages when incorporated into such textiles. One of the most important of the advantages is the resulting flexibility of the fabric as compared to the comparative stiffness of fabrics treated with polyvinyl-acetate alone. It has also been found that fabrics sized with the present composition may be ironed with ease. Still further it has been found that fabrics sized with the present composition are more durable and are particularly wash resistant as compared with fabrics treated with polyvinylacetate.

Since the degree of flexibility of the fabric is substantially proportional to the proportion of copolymer used, this property as well as the stability of the polyvinyl-acetate emulsion may be considered in selecting the proportion of copolymer desired.

I claim:

1. A composition of matter consisting essentially of a water emulsion of polyvinyl acetate and a water emulsion of styrene-butadiene copolymer, said copolymer being present in an amount within the range of about .5 part per part polyvinyl acetate to about 1.6 parts per part polyvinyl acetate.

2. A composition of matter comprising a water emulsion of polyvinyl acetate and a water emulsion of styrene-butadiene copolymer, said copolymer being present in a proportion exceeding about 0.5 part per part of polyvinyl acetate.

3. The method of preparing a composition for finishing textiles which comprises the steps of adding an emulsion of styrene-butadiene copolymer to an emulsion of polyvinyl acetate in a proportion exceeding about 0.5 part of said copolymer per part of polyvinyl acetate and thereafter diluting the mixture with water.

4. The method of preparing a composition for finishing textiles which comprises the steps of adding an emulsion of styrene-butadiene copolymer to an emulsion of polyvinyl acetate in a proportion exceeding about .5 part of said copolymer per part of polyvinyl acetate and being less than about 1.6 parts per part of polyvinyl acetate, and thereafter diluting the mixture with water.

HARRY L. SNYDER, Jr.

REFERENCES CITED

The following references are of record in the file of this patent:

UNITED STATES PATENTS

| Number | Name | Date |
| --- | --- | --- |
| 2,054,131 | Kollek | Sept. 15, 1936 |
| 2,383,789 | Harvey | Aug. 28, 1945 |